Figure 1:
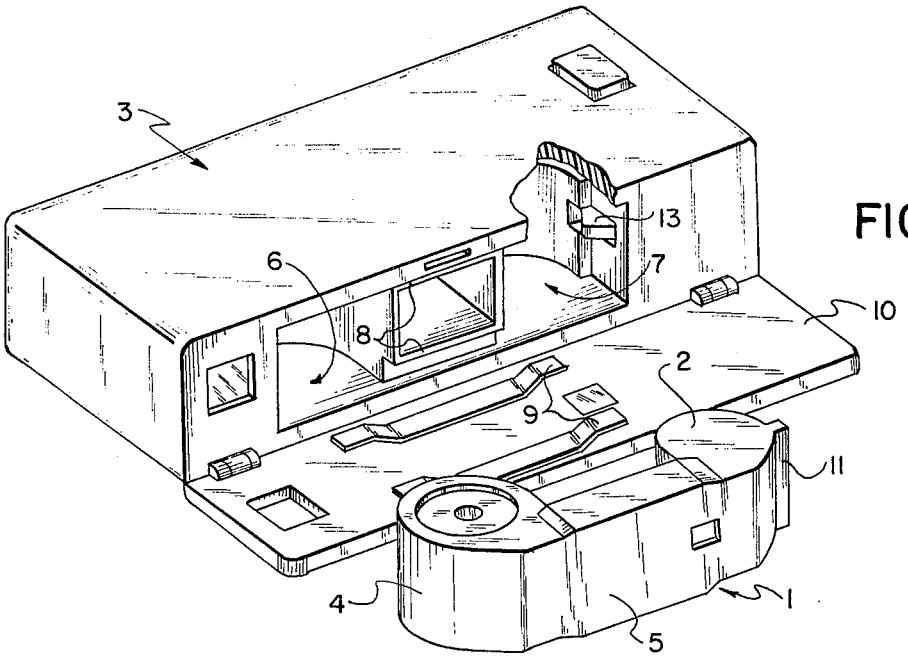
Figure 2:
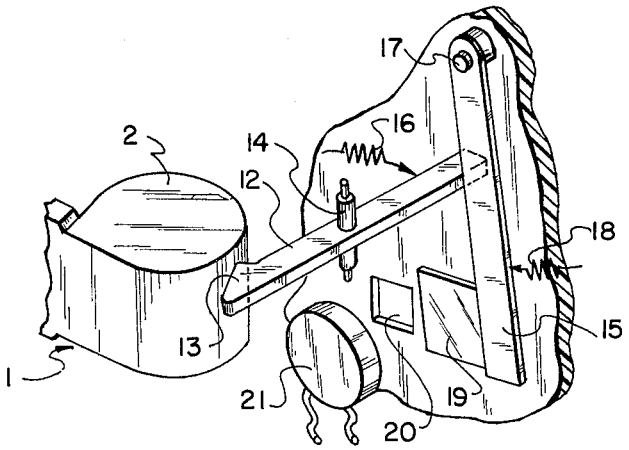
Figure 3:
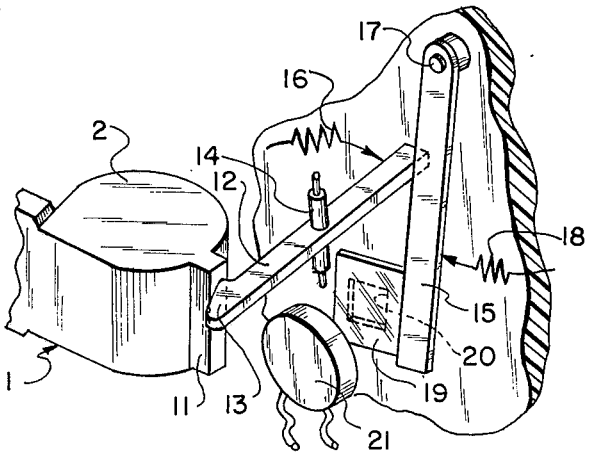
Figure 4:
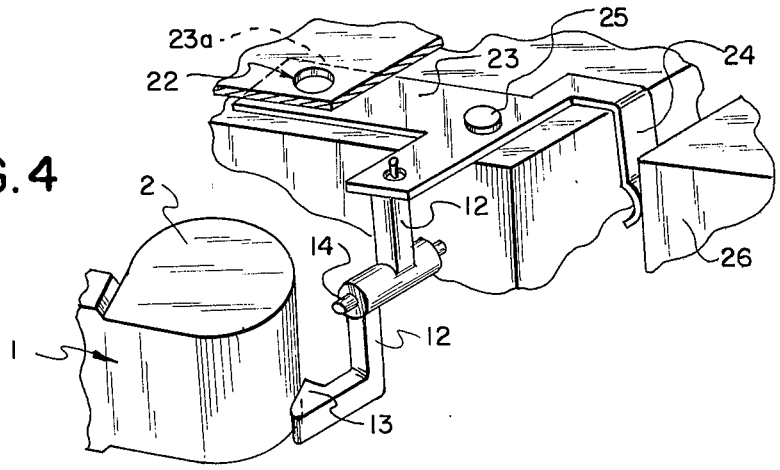
Figure 5:
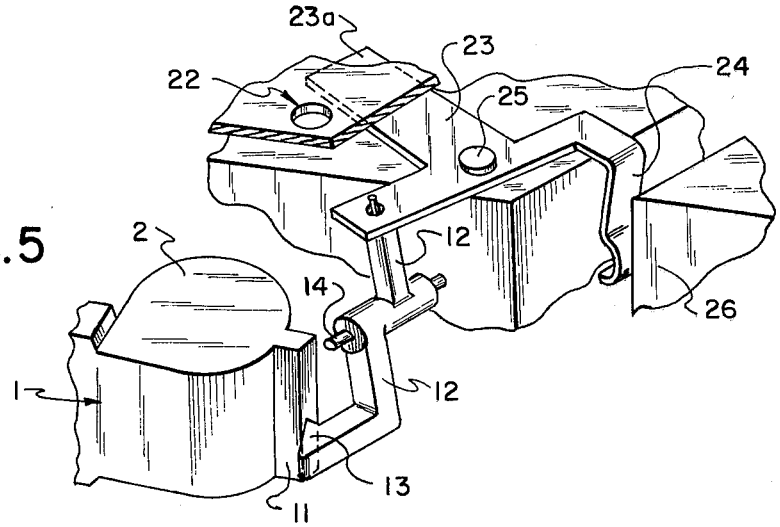
Figure 6:
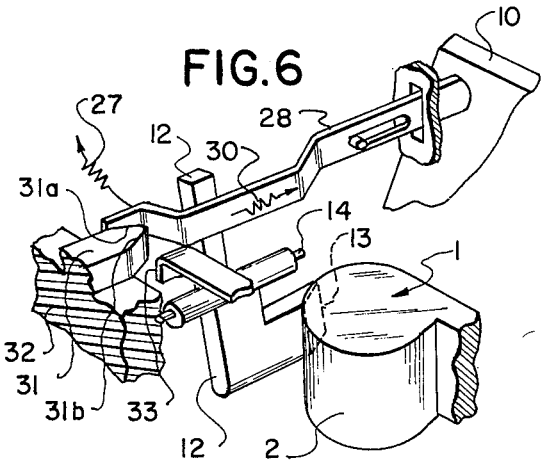
Figure 7:
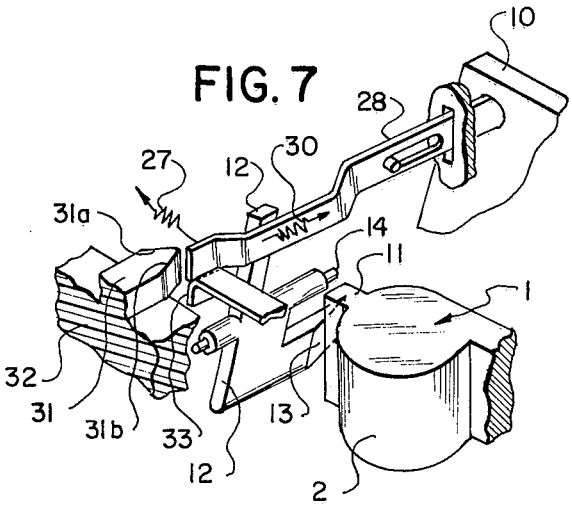

United States Defensive Publication [19] (H) [11] T961,004

Horton [43] Aug. 2, 1977

[54] FILM SPEED SENSING DEVICE

[76] Inventor: William Howard Horton, 901 Elmgrove Rd., Rochester, N.Y. 14650

[21] Appl. No.: 736,055

[22] Filed: Oct. 27, 1976

[51] Int. Cl.[2] ..... G03B 17/26

[52] U.S. Cl. ..... 354/21; 354/275

[57] ABSTRACT

A photographic still camera utilizes film cartridges of the type having two parallel cylindrical film compartments connected by a wall member that extends between the two compartments in a plane generally parallel to the compartment axes. A rib extends from one end of the cartridge, i.e., from the outer surface of one of the film compartments. The presence of the rib signifies that the film in the cartridge has a particular film speed rating. When a cartridge provided with such a rib is inserted into the camera, in a direction perpendicular to its wall member, its rib engages a cam surface of a pivotally mounted sensing member in the camera and displaces that cam surface in a direction that is generally endwise with respect to the cartridge. Displacement of the sensing member effects an adjustment of the camera to compensate for the film speed designated by the rib.

6 Claims, 2 Sheets Drawing,

14 Pages Specification

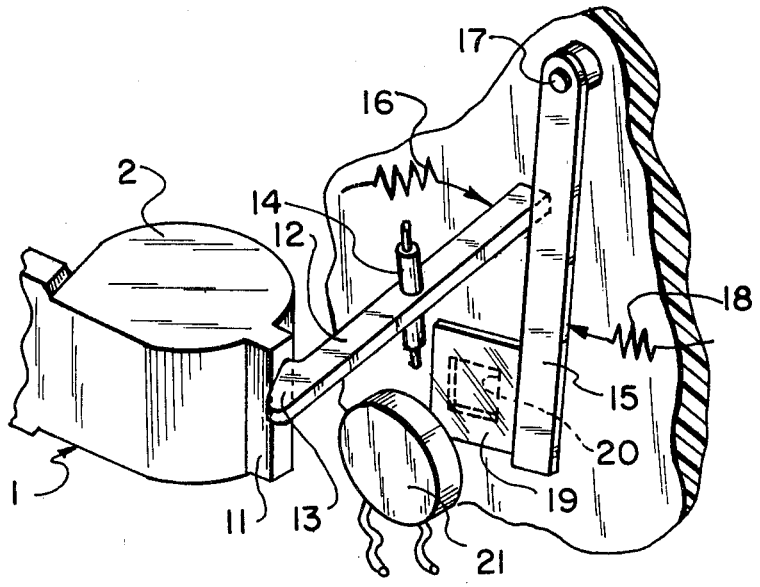

The file of this unexamined application may be inspected and copies thereof may be purchased (849 O.G. 1221, Apr. 9, 1968).